United States Patent [19]

Motoda

[11] 4,449,884
[45] May 22, 1984

[54] UNIVERSAL ROBOT
[75] Inventor: Kenro Motoda, Tokyo, Japan
[73] Assignee: Motoda Denshi Kogyo Kabushiki Kaisha, Tokyo, Japan
[21] Appl. No.: 305,853
[22] Filed: Sep. 25, 1981
[30] Foreign Application Priority Data
Nov. 25, 1980 [JP] Japan .................... 55-165653
[51] Int. Cl.³ .............................. B25J 5/04
[52] U.S. Cl. .................... 414/749; 414/590; 414/728; 248/124; 212/73; 212/75
[58] Field of Search .............. 414/751–753, 414/728, 749, 750, 222–226, 589, 590; 248/124, 285–287; 212/73, 75, 208, 199, 257

[56] References Cited
U.S. PATENT DOCUMENTS

| | | | |
|---|---|---|---|
| 2,000,054 | 5/1935 | Weeks | 212/75 |
| 2,548,650 | 4/1951 | Brandt | 248/124 X |
| 2,733,035 | 1/1956 | Rocheleau | 248/124 |
| 3,984,009 | 10/1976 | Holroyd | 414/728 |
| 4,061,062 | 12/1977 | Peltier | 414/728 X |
| 4,144,973 | 3/1979 | Reale | 414/728 X |

Primary Examiner—Robert J. Spar
Assistant Examiner—Terrance L. Siemens

[57] ABSTRACT

A universal robot comprising an X-axis arm (3) which is mounted on a post (1) through a support member (2) movable in the vertical direction and is tiltable into a desired position, and a Z-axis arm (6) which is mounted on a slider (5) movable along the X-axis arm (3) and is tiltable into a desired position. With this arrangement, the transportation of a load to be moved in two-dimensional directions can be carried out by a single linear movement of the slider, so that not only the time required for the load transportation can be reduced but the accuracy of the transportation can be improved very much.

6 Claims, 7 Drawing Figures

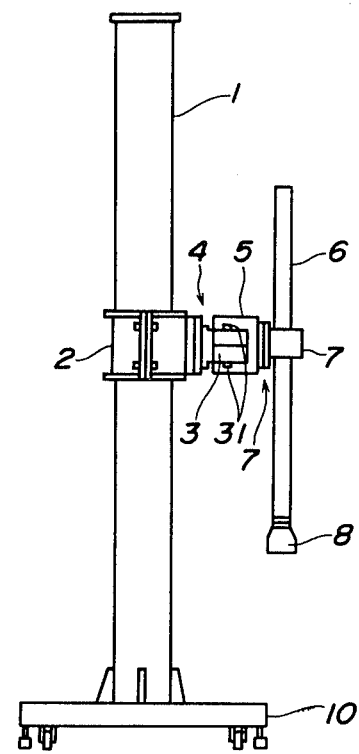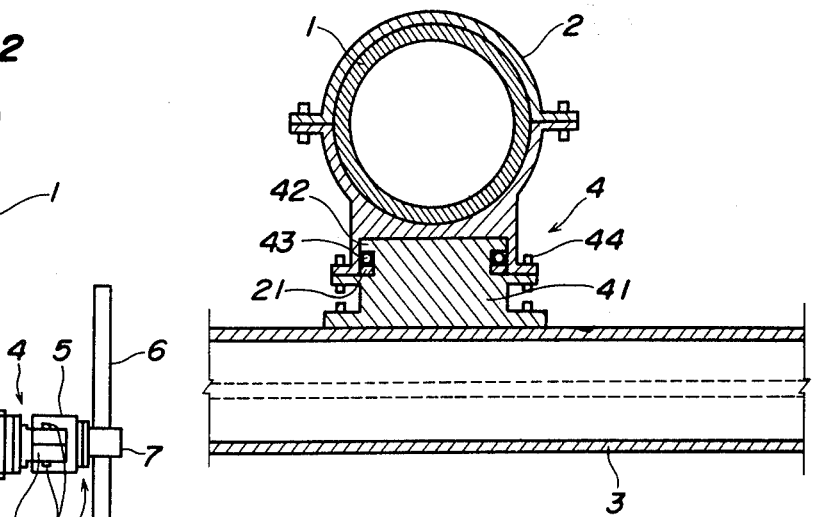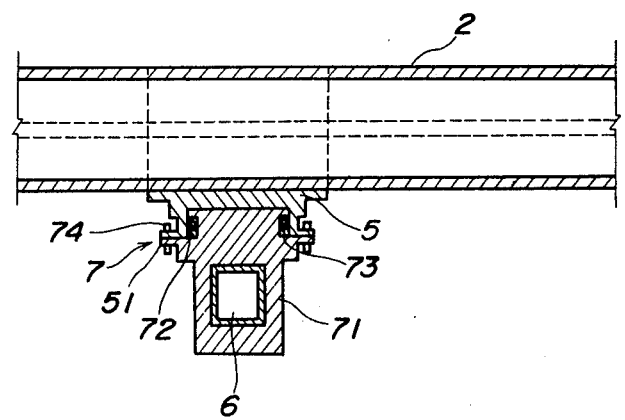

UNIVERSAL ROBOT

BACKGROUND OF THE INVENTION

1. Field of the Invention

This invention relates to a universal robot which is capable of carrying, by a single linear movement, a load to be moved in two-dimensional directions.

2. Description of the Prior Art

A conventional robot, which moves a load by a hoist or crane means, carries the load by the movements of a slider adapted to move on an X-axis arm thereof in the horizontal direction and a Z-axis arm supported by the slider and adapted to move in the vertical direction. With this arrangement, two-steps of movements, i.e., a movement of a slider in the horizontal (X-axis) direction and a movement of the Z-axis arm in the vertical (Z-axis) direction, are needed to move the load to a required position. This requires a superfluous time as much to carry the load. This superfluous time causes a serious loss of time when a large amount of articles are carried. Thus, the curtailment of the carriage time has been an argent task to be achieved.

Furthermore, the two-step movements by the robot for carrying the load require two-axis control, i.e., control for the movement of the slider and for the movement of the Z-axis arm. This makes the structure of a control system complicated and the operation thereof troublesome. Besides, errors inherent in the movements of the slider and the Z-axis arm are accumulated and appear as an error of the carriage terminal point. Therefore, even when each of the errors in movements is small, the accumulated errors in the movements will possibly exceed an allowance and proper automatic carriage will be prevented when a large amount of loads are carried.

OBJECT OF THE INVENTION

The present invention has been made with a view to solving these problems, and it is an object of the present invention to provide a universal robot wherein an X-axis arm and a Z-axis arm are made rotatable and a support member for the arm is made movable in the vertical direction to perform, by one-step linear movement, the load carriage which otherwise requires two-dimensional movements, so as to curtail a time required for the load carriage, simplify the structure and operation of a control system, reduce an error in carriage due to errors in the movements and to broaden the working range in the height (Z-axis) direction.

SUMMARY OF THE INVENTION

In accordance with the present invention, there is provided a universal robot wherein an X-axis arm is mounted on a support means provided on a post and a Z-axis arm is mounted on a slider slidable on the X-axis arm in the longitudinal direction thereof, which robot is characterized in that said X-axis arm is mounted on said support member through a rotating mechanism which is rotatable into and lockable in a desired position, said Z-axis arm is mounted on said slider through a rotating mechanism which is rotatable into and lockable in a desired position, and said support member is mounted on said post movably in the vertical direction.

BRIEF DESCRIPTION OF THE DRAWINGS

FIG. 2 is a side elevational view of the robot illustrated in FIG. 1;

FIG. 3 is an enlarged sectional view of an X-axis supporting portion;

FIG. 4 is an enlarged sectional view of a Z-axis supporting portion;

DESCRIPTION OF THE EMBODIMENTS

Figure 1:
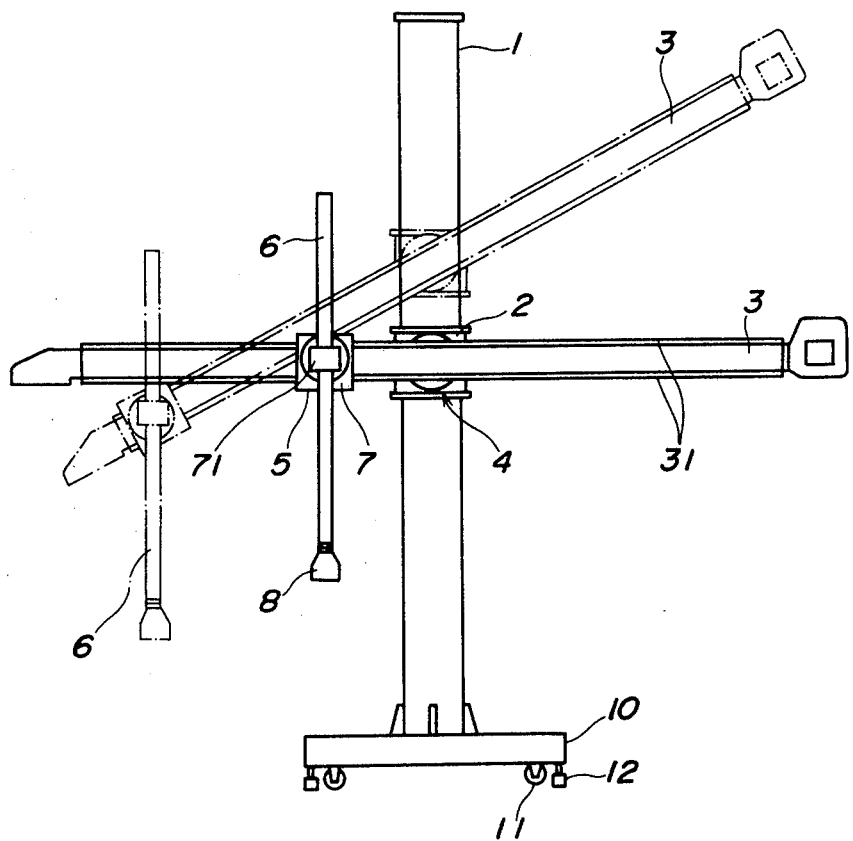
FIG. 1 is a front view of a first form of a universal robot embodying the present invention.

This invention will now be described in detail referring to the embodiments illustrated in the drawings.

1 is a hollow cylindrical post standing upright. A support member 2 is so mounted on the post 1 as to be movable up and down relative to the post 1. The support member 2 may manually be moved upwardly or downwardly after the support member 2 has been loosened from the post 1 by loosening a bolt, or may automatically be moved in the vertical direction and stopped by a driving means such as a rack-pinion mechanism coupled to a motor.

3 is an X-axis arm made of a light-weight material and extending laterally, and this X-axis arm is rotatably fitted, at an intermediate portion between the ends thereof, to the support member 2 through a rotating mechanism 4 for the X-axis arm. The rotating mechanism 4 for the X-axis arm is comprised, as illustrated in FIG. 3, a part of the support member 2 and a rotating member 41. An end of this rotating member 41 is fixed to the X-axis arm 3, while another end of the rotating member 41 has a sliding face 42 which is in contact with a sliding face of the support member 2 through a bearing 43 so as to slide and rotate relative to each other. However, the sliding face 42 is normally locked to the support member 2 by a bolt 44 to prevent the relative rotation between the sliding faces. A slot formed on the support member 2 for receiving the bolt is not shown in the drawings but it is formed in an elongated shape. Thus, the rotating member 41 may be rotated when the bolt 44 is loosened, to rotate the X-axis arm to a desired angular position as shown by a phantom line in FIG. 1.

5 is a slider which is mounted on the X-axis arm 3 so as to be moved along guide rails 31 of the X-axis arm 3 by a rope or the like. 6 is a Z-axis arm which is made of a light-weight material and extends normally in the vertical direction. The Z-axis arm 6 is rotatably and slidably mounted on the slider 5 through a rotating mechanism 7 for the Z-axis arm. The rotating mechanism 7 for the Z-axis arm is formed of a part of the slider 5 and a rotating member 71 as illustrated in FIG. 4. More specifically, one end of the rotating member 71 is fixed to the slider 5, while another end thereof has a sliding face 72 which slidably contacts a sliding face 51 of the slider 5 through a bearing 73 so as to rotate relative to each other, but which is normally locked to the slider 5 by a bolt 74 to prevent the relative rotation therebetween. The Z-axis arm 6, therefore, may be rotated into and locked in a desired angular position in the same manner as of the X-axis arm 3.

The Z-axis arm 6 is held by the rotating member 71 slidably in the vertical direction. The Z-axis arm 6 may be slidingly displaced automatically by a driving means such as a rack-pinion mechanism connected to a motor or may be displaced manually. The Z-axis arm 6 has, at a lower end thereof, a load holding member 8.

10 is a truck for supporting the whole robot. The post 1 is fixedly mounted on the truck, and the truck can be moved by wheels 11 and locked by anchors 12. With this arrangement, the robot of the present invention can be moved to a desired place to enhance its usefulness. Of course, the post 1 may alternatively be fixed on the floor.

As driving means for the rotating mechanisms of the X-axis and Z-axis arms, there may be employed a fluid cylinder or an automatic means adapted to be operated by an electric motor etc. In this robot, the bearings 43, 73 may be omitted from the sliding faces 42, 72 of the rotating mechanisms 4, 7, respectively.

The operation of the so arranged robot of the present invention will now be described.

The robot is first adjusted before the carriage or transportation of a load. More specifically, the X-axis arm 3 is rotated by the rotating mechanism 4 by such an angle that the difference in height between a start point on the X-axis arm 3 for the transportation of the load and an end point on the X-axis arm 3 for the transportation may be equal to the difference in height between a load feeding position and a load deposition position. When the X-axis arm 3 is rotated, the Z-axis arm 6 which is normally held at an angle of 90° to the X-axis arm 3 is tilted by an angle corresponding to the rotation angle of the X-axis arm 3. This prevents proper grasping of the load by the load holding member 8, and so the Z-axis arm 6 is rotated by the rotating mechanism 7 by an angle corresponding to the rotation angle of the X-axis arm 3 so as to position the Z-axis arm 6 in the vertical position. Then, the height of the support member 2 is adjusted so that the load holding member 8 fixed at the lower end of the Z-axis arm may receive and release the load at the load feeding position and the load depositing position, respectively, when the Z-axis arm 6 is positioned at the start point and the end point of the transportation, respectively. After completion of the adjustment of these elements, the robot assumes a position as shown by the phantom line in FIG. 1.

Figure 7:
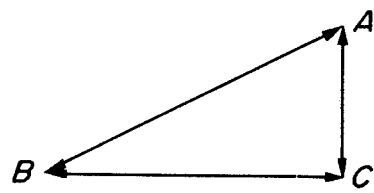
FIG. 7 is a diagram showing the transportation step of the universal robot according to the present invention and the transportation steps of a conventional robot.

The load carriage by the so adjusted robot can be effected by a single step in which the load is linearly moved from the transportation starting point (the load feeding position) A (or B) and the transportation ending point (the load depositing position) B (or A) as illustrated in FIG. 7. More specifically, the transportation can be carried out by a single linear run of the slider 5, which holds the Z-axis arm 6, between A and B. Thus, there is now no need to move the load, as in a conventional robot, separately by the slider 5 and by the Z-axis arm 6 by a distance corresponding to the difference (A-C) in height between the load feeding position A and the load depositing position B and by a distance (B-C) therebetween, respectively.

Figure 5:
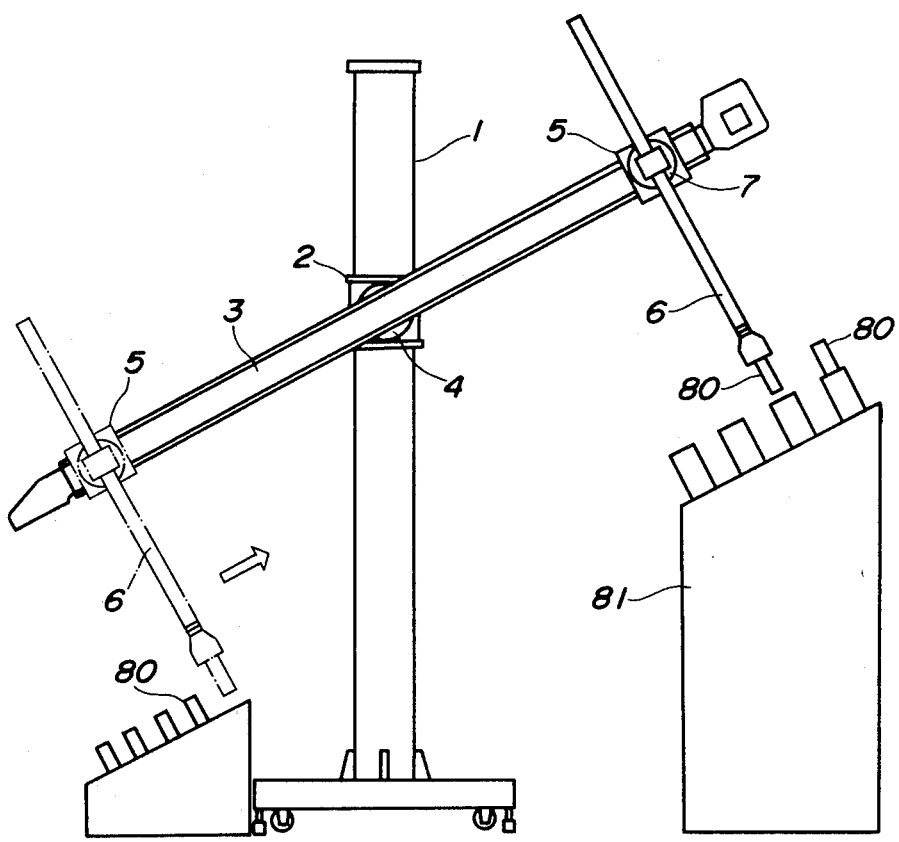
FIG. 5 is an explanatory view illustrating an operation mode of the robot illustrated in FIG. 1.

The robot of the present invention may also be operated in a manner as illustrated in FIG. 5. In case where a load 80 is required to be transported to and placed onto an inclined table 81, the X-axis arm 3 is tilted by an angle suited to the inclination of the table 81 and the Z-axis arm 6 is held at an angle of 90° to the X-axis arm 3. By this arrangement, the load transportation from the starting point to the ending point between which there is a difference in height, can be carried out by a single uniaxial movement on the inclined X-axis arm 3, and, since the Z-axis arm 6 is held at a perpendicular position to the inclined table 81, the load 81 can be deposited onto the inclined face by a simple, single operation. Thus, when the transportation conditions involve an angle as well as a difference in height, only the X-axis arm 3 may be rotated to transform the coordinates so as to easily carry out the operation which would otherwise require complicated steps.

Figure 6:
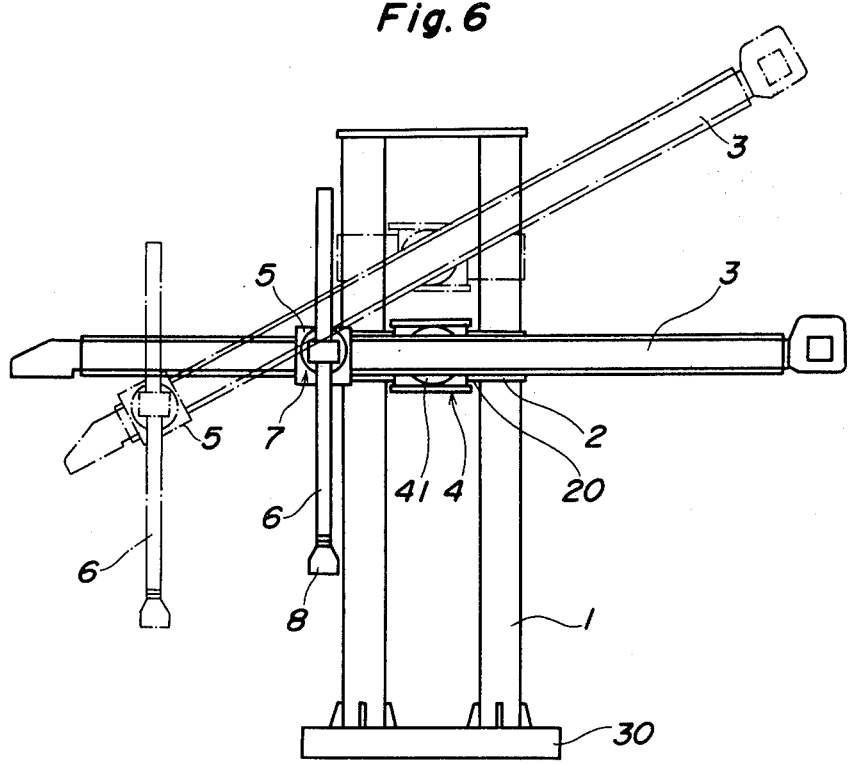
FIG. 6 is a front view of a second form of a universal robot embodying the present invention.

FIG. 6 illustrates a second embodiment of the present invention, wherein two posts 1 are provided to prevent the robot from being unbalanced when the X-axis arm 3 is long or a heavy, bulky load is to be transported and to keep the robot stable. In this embodiment, two support members 2 movable in the vertical direction are each mounted on the respective posts 1, and a support rod 20 is provided between the support members 2, and a part of the support rod 20 and a rotating member 41 comprise a rotating mechanism 4 similar to the rotating mechanism of the first embodiment. An X-axis arm 3 mounted on the support rod 20 through the rotating mechanism 4, a slider 5 and a Z-axis arm 6 are all formed identically with those of the first embodiment. 30 is a base for supporting the two posts 2. Although the base illustrated in connection with the second embodiment is not movable, the base may be a truck supporting plural posts which is movable and lockable as the truck of the first embodiment.

As described above, even when there are distance in the vertical and horizontal directions between the load feeding position and the load depositing position, the robot of the present invention can carry out the transportation of a load by a single step in which the Z-axis arm is linearly moved on the X-axis arm through the slider, after the preliminary adjustment of the angles of the X-axis arm and the Z-axis arm according to the distance and adjustment of the height of the X-axis arm.

Therefore, the transportation time can be curtailed as compared with the conventional robot which needs two steps of linear movements, i.e., movement in the vertical (Z-axis) direction and movement in the horizontal (X-axis) direction. In addition since it will suffice to control only the movement of the slider, the control axis of the control system can be reduced to one. Therefore, not only the control system can be simplified and improved in accuracy, but a driving means for the rope or cylinder may be omitted as the case may be because the automatic movement of the Z-axis arm is not always needed.

Furthermore, since the load can be carried by a single linear movement, an error in carriage can be reduced to an error corresponding to one-step movement and the error can be smaller than that of the conventional robot. Thus, accurate and precise transportation is enabled. This accuracy and precision of the transportation can further be enhanced in combination with the improvement in accuracy of the control system as described above.

Moreover, the universal robot of the present invention has not only the effects that the transportation is sped-up and made more accurate and the control system is simplified and improved in accuracy, but the effect that the working space or range is broadened. More specifically, the maximum difference in height between the load feeding position and the load depositing position which has heretofore been limited within the movable range of the Z-axis arm, can be increased at least to the length of the post, and the difference in height of the load feeding and depositing positions can be even larger than the height of the post when the support member is fixed at a top portion of the post and the X-axis arm is rotated and inclined. Thus, the working space can be widened very much and the utility of the robot can remarkably be broadened.

I claim:

1. A universal robot wherein an X-axis arm is mounted on a support means provided on a post and a Z-axis arm is mounted on a slider slideable on the X-axis arm in the longitudinal direction thereof, said X-axis arm having a length, which robot is characterized in that said X-axis arm is mounted solely on said support means through a rotating mechanism which is rotatable into and lockable in a desired position, said X-axis arm extends in opposite directions on both sides of said post, said Z-axis arm is mounted on said slider through a rotating mechanism which is rotatable into and lockable in a desired position, said slider is slideable along the entire length of said X-axis arm, and said support means is mounted on said post moveably in the vertical direction.

2. A universal robot which comprises:
   a base;
   a post affixed to said base so as to stand upright thereon;
   an X-axis arm having a longitudinal axis and a length, said X-axis arm being mounted solely on said post and extending in opposite directions on both sides of said post;
   a support member provided on said post for supporting said X-axis arm and moveable with said X-axis arm, on the post, in the vertical direction;
   a first rotating mechanism provided between said support member and said X-axis arm for allowing said X-axis arm to rotate into a desired tilted position relative to said post;
   a slider mounted on said X-axis arm and slideable along the longitudinal axis of said X-axis arm over the entire length of said X-axis arm;
   a Z-axis arm mounted on said slider so as to move with said slider; and
   a second rotating mechanism provided between said slider and said Z-axis arm for allowing said Z-axis arm to tilt into a desired angular position relative to said X-axis arm;
   a load holding member provided at a lower end of said Z-axis arm.

3. A universal robot as claimed in claim 2, which further comprises wheels provided on said base for moving the whole robot to a desired position.

4. A universal robot as claimed in claim 2, wherein said first rotating mechanism comprises a rotating member fixed, at one end thereof, to said X-axis arm and having, at another end thereof, a sliding face, a bearing, and a sliding face of said support member which slideably contact said sliding face of the rotating member through said bearing; and said second rotating mechanism comprises a rotating member fixed, at one end thereof, to said slider and having, at another end thereof, a sliding face, a bearing, and a sliding face of said slider which slideably contact said sliding face of said rotating member through said bearing.

5. A universal robot which comprises:
   a base;
   a plurality of posts fixed to said base so as to stand upright thereon;
   support members each mounted on the respective posts and moveable thereon in the vertical direction;
   a support rod provided between said support members and moveable thereon in the vertical direction;
   an X-axis arm having a longitudinal axis thereof and a length, said X-axis arm being mounted solely on said support rod and extending in opposite directions on opposite sides of said posts;
   a first rotating mechanism provided between said support rod and said X-axis arm for allowing said X-axis arm to tilt in a desired angular position relative to the posts;
   a slider mounted on said X-axis arm and slideable along the longitudinal axis of said X-axis arm over the entire length of said X-axis arm;
   a Z-axis arm mounted on said slider so as to move with said slider;
   a second rotating mechanism provided between said slider and said Z-axis arm for allowing said Z-axis arm to tilt into a desired angular position relative to said X-axis arm; and
   a loading holding member provided at a lower end of said Z-axis arm.

6. A universal robot as claimed in claim 5, wherein said first rotating mechanism comprises a rotating member which is fixed, at one end thereof, to said X-axis arm and having, at another end thereof, a sliding face, a bearing, and a sliding face of said support rod which slideably contact said sliding face of said rotating member through said bearing; and said second rotating mechanism comprises a rotating member fixed, at one end thereof, to said slider and having, at another end thereof, a sliding face, a bearing, and a sliding face of said slider which slideably contact said sliding face of said rotating member through said bearing.

* * * * *